United States Patent [19]
Austin et al.

[11] Patent Number: 4,997,732
[45] Date of Patent: Mar. 5, 1991

[54] BATTERY IN A VACUUM SEALED ENVELOPING MATERIAL AND A PROCESS FOR MAKING THE SAME

[75] Inventors: Robert A. Austin, Dayton; Denis Fauteux, Centerville, both of Ohio

[73] Assignee: MHB Joint Venture, Ohio

[21] Appl. No.: 504,713

[22] Filed: Apr. 3, 1990

Related U.S. Application Data

[63] Continuation of Ser. No. 331,334, Mar. 30, 1989, abandoned.

[51] Int. Cl.$^5$ .............................................. H01M 6/46
[52] U.S. Cl. ..................................... 429/153; 429/163; 429/185; 429/192; 429/210
[58] Field of Search ............... 429/152, 153, 162, 163, 429/192, 210, 178, 181, 185

[56] References Cited
U.S. PATENT DOCUMENTS

| | | | |
|---|---|---|---|
| 2,870,235 | 1/1959 | Soltio | 429/139 |
| 3,853,629 | 12/1974 | Elliott | 429/162 X |
| 4,086,400 | 4/1978 | Hyland et al. | 429/162 X |
| 4,547,440 | 10/1985 | Hooper | 429/192 X |
| 4,548,880 | 10/1985 | Suzuki et al. | 429/162 |
| 4,589,197 | 5/1986 | North | 429/217 X |
| 4,609,598 | 9/1986 | Tucholski et al. | 429/174 |
| 4,664,994 | 5/1987 | Koik e et al. | 429/163 |
| 4,756,717 | 7/1988 | Sturgis et al. | 429/162 X |

Primary Examiner—Anthony Skapars
Attorney, Agent, or Firm—Thompson, Hine & Flory

[57] ABSTRACT

A battery assembly and method for making the same comprising:
a laminar battery, said laminar battery including:
an anode layer;
an ionically conductive electrolyte layer;
a cathode layer;
said electrolyte layer being interposed between said anode layer and said cathode layer, and said layers being assembled to form an electrical cell;
a pair of electrically conductive terminals in electrical contact with said anode layer and said cathode layer; and
a protective sheet material enveloping said laminar battery;
said sheet material being heat sealed at the periphery of said laminar battery and about said terminals to exclude air and moisture and said terminals extending from or being accessible through said protective sheet material for connection to a device which is powered by said laminar battery is disclosed. The battery assembly is formed, and the method includes that the sealing occur under a vacuum.

10 Claims, 2 Drawing Sheets

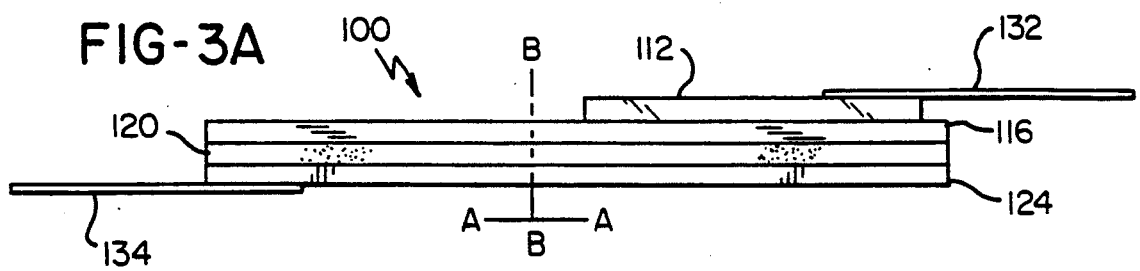
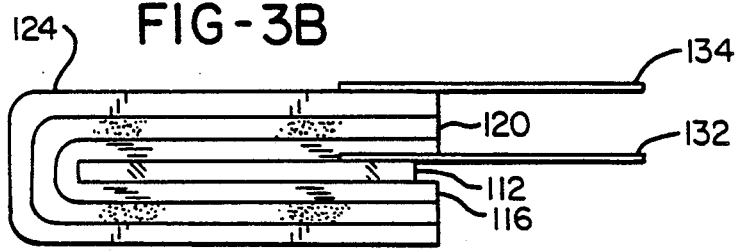
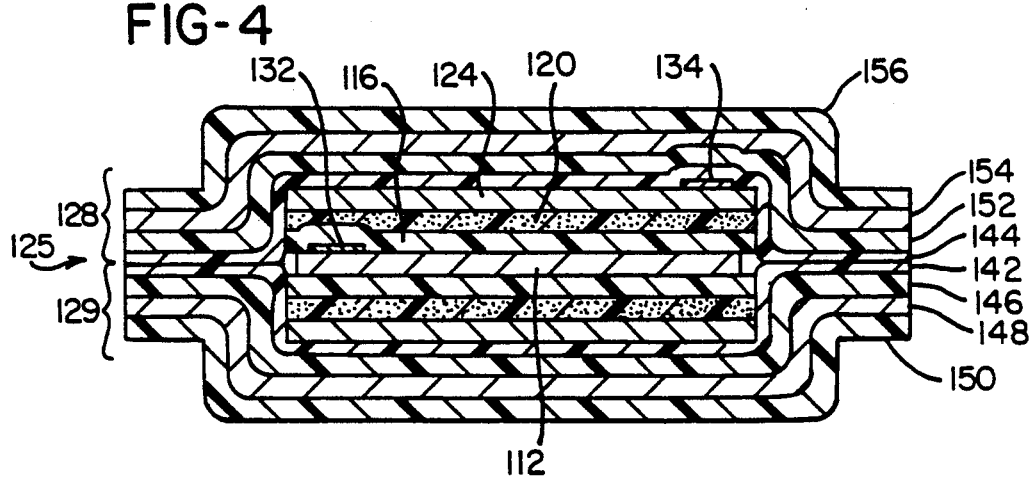
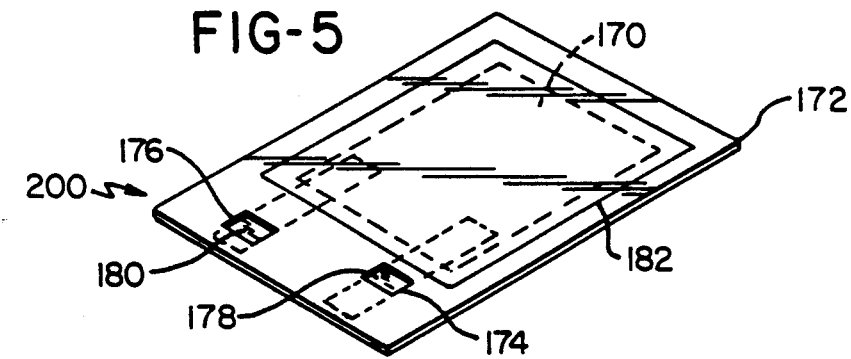

BATTERY IN A VACUUM SEALED ENVELOPING MATERIAL AND A PROCESS FOR MAKING THE SAME

This is a continuation of co-pending application Ser. No. 331,334, filed Mar. 30, 1989, now abandoned.

BACKGROUND OF THE INVENTION

1. Field of the Invention

The present invention relates to the manufacture of battery assemblies, and more particularly solid state batteries maintained in a protective material to exclude air, water and other gasses to protect the battery against physical abuse to increase its shelf life. The battery assembly is produced by surrounding solid state battery components with an enveloping material and sealing the edges of the material around the components in a vacuum environment.

2. Description of the Prior Art

Presently there is a high level of interest in industry in designing thin layer solid state batteries, particularly lithium anode cells. These batteries include a lithium anode, a transition metal oxide polymer composite cathode, and a solid or liquid electrolyte which includes a dissolved lithium salt. Examples of such batteries are set forth in U.S. Pat. Nos. 4,303,748 to Armand, 4,589,197 to North, 4,228,226 to Christiansen and U.S. patent application Ser. Nos. 238,071, filed Aug. 30, 1988; 115,492 filed Oct. 30, 1987; and 173,385 filed Mar. 25, 1988.

A principal object of these batteries is to make them as thin and compact as possible while still satisfying market needs in terms of storage capacity, current density, shelf-life and the like.

A problem in achieving this object resides in the fact that these batteries must be moisture impermeable as some of the components are very hygroscopic and can absorb water and gasses which can ruin the battery in less than a few hours. Additional problems have included accessing current from the battery once the components of the battery have been sealed, and the inability of such batteries to withstand the rigors of transportation, insertion and use into products.

Attempts have been made in the art to remedy some of the above described problems. For example, U.S. Pat. No. 4,502,903, assigned to Polaroid teaches the construction of the anode and cathode assemblies prior to sealing in a controlled atmosphere that is relatively inert to lithium and free of water, e.g. in dry air at a relative humidity of not more than 1 to 2 percent. This patent also teaches sealing of the edges of the battery unit under vacuum by heat and pressure.

U.S. Pat. No. 4,756,717, also assigned to Polaroid teaches the sealing of the battery component edges, under vacuum with the aid of heat and pressure. The sealed battery is assembled on a card stock base and is overwrapped with a layer of inert, chemically stable material which serves primarily to prevent mechanical interference with underlying components during the early stages of construction of the battery At a later stage of construction, this overwrap layer is sealed under a vacuum using heat and pressure Examples of overwrapping materials include polyethylene, paper, glassine and paper-foil laminates. This arrangement is taught with respect to a LeClanche cell.

Although the above described batteries alleviate some problems, they are deficient with respect to nonaqueous cells as they provide limited protection against environmental contamination, particularly at the areas of sealing Accordingly, there exists a need in the art for a battery which is stable for extended periods of time and is resistant to mechanical shock or water or air degradation.

DEFINITIONS

The term "battery" can include a single cell, or a plurality of cells connected in either series or parallel fashion to furnish electrical current. The term "cell" includes an anode layer, cathode layer, electrolyte layer, and a pair of electrically conductive terminals; or a plurality of these layers connected in bifaced, bi-polar, or other cell configuration designs known in the art.

In the present invention, more than one battery may be incorporated between the sheets of protective material and more than one cell configuration may be utilized in each of the batteries so incorporated.

SUMMARY OF THE INVENTION

In accordance with the present invention, a battery assembly comprising a solid state battery maintained in a protective material is provided. The protective material functions to exclude air and water, provide rigidity and protect the battery during physical handling to promote the shelf life of the battery.

In accordance with one embodiment, the battery assembly comprises a laminar battery including an anode layer, an ionically conductive electrolyte layer, and a cathode layer, the electrolyte layer being interposed between the anode layer and the cathode layer and the layers assembled to form an electrical cell; a pair of electrically conductive terminals in electrical contact with the anode layer and the cathode layer; and a protective sheet material enveloping the laminar battery; the sheet material being heat-sealed at the periphery of the laminar battery and about the terminals to exclude air and moisture and the terminals extending from or being accessible through the protective sheet material for connection to a device which is powered by the laminar battery.

It is preferable that the laminar battery is a lithium thin cell battery. Further, the protective sheet material may take the form of any number of configurations. The material is typically a multi-layered material including one or more heat sealable polymeric layers and one or more moisture and gas impermeable layers and optionally, one or more outer protective polymer layers. Where the multilayered protective sheet material does include one or more outer protective polymer layers, the outer protective polymer layer or layers will also function to cover or fill any microscopic holes that may exist in the moisture and gas impermeable layer, providing a greater than expected air and water occlusion capability. Alternatively, the protective sheet material may consist of a single layer as opposed to a multilayered material if the single layered material is able to provide all of the functions required of the multilayered film.

Also, in accordance with the present invention a method is provided for producing the battery assembly. The method comprises the steps of inserting a finished thin cell laminar battery including an anode layer, an ionically conductive electrolyte layer, a cathode layer and a pair of electrically conductive terminals in electrical contact with said anode layer and said cathode layer between sheets of a protective material and sealing the material with heat and pressure such that external access to said pair of electrically conductive terminals is provided. In accordance with one embodiment, the sealing step is conducted in a vacuum atmosphere.

Thus, one object of the present invention is to provide a battery assembly including a laminar thin cell battery which is less susceptible to degradation from water, air and physical shock and has an extended shelf life.

Another object of the present invention is to provide a method for producing a thin cell laminar battery assembly including a laminar thin cell battery which is less susceptible to degradation from water, air and physical shock and has an extended shelf life.

Other objects and features of the present invention will become apparent to those skilled in the art as the disclosure is made in the following description taken in conjunction with the accompanying drawings.

BRIEF DESCRIPTION OF THE DRAWINGS

FIGS. 3(a)-(b) show one method for producing an alternative laminar battery assembly of the present invention.

FIG. 4 is a cross-sectional schematic elevational view of the battery of FIG. 3, wherein the battery is inserted into a protective material.

FIG. 5 is an alternative battery assembly embodying the teachings of the instant invention.

DESCRIPTION OF THE PREFERRED EMBODIMENT

Figure 1:
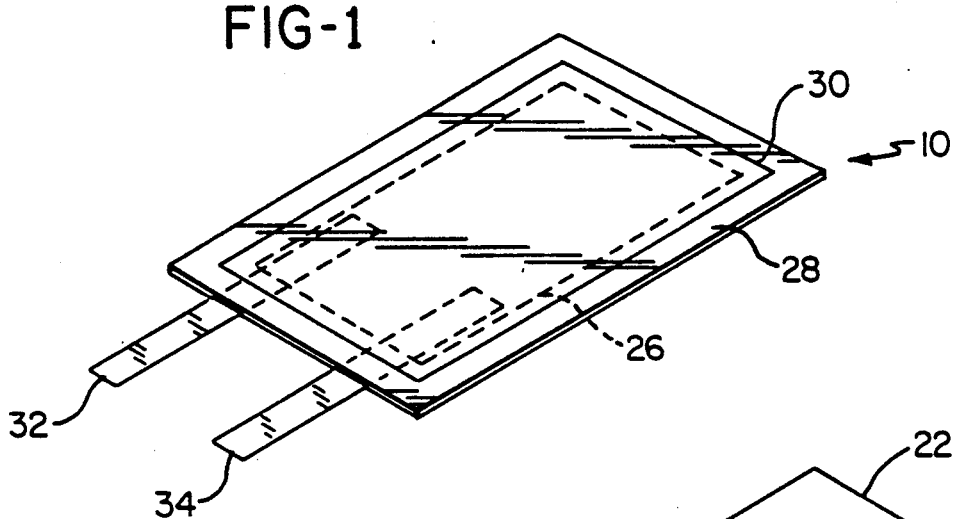
FIG. 1 is a perspective view of a battery assembly showing a laminar thin cell battery in phantom enveloped by a heat-sealed moisture impermeable multilayered sheet material embodying the teachings of the instant invention.

In describing the invention illustrated in the drawings, specific terminology will be resorted to for the sake of clarity. However, the invention is not intended to be limited to the specific terms so selected, and it is to be understood that each specific term selected includes all technical equivalents which operate in a similar manner to accomplish a similar purpose.

As illustrated in FIG. 1, the present invention comprises a battery assembly 10, including a thin cell laminar battery 26, shown in phantom, enveloped by a multilayered air and water occlusive protective sheet film material 28 which is heat sealed around its periphery 30. Connected to battery 26 are electrodes 32 and 34, which, as will be discussed in greater detail with respect to FIG. 4, are respectively electrically connected to the anode and cathode of battery 26.

While batteries in accordance with this invention may be of any desired electrochemical type, such as nickel cadmium, nickel hydroxide, LeClanche, or lead acid, for purposes of illustration and in accordance with a preferred embodiment, the battery is of the lithium anode type.

Laminar thin-cell batteries containing lithium anodes are known to the art, and those skilled in the art will appreciate that the laminar batteries can include a single cell, or a plurality of cells. Furthermore, the cells also can include various constructions such as bifaced or bipolar cell designs. Other examples of cell constructions include a jelly roll or a fan folded laminate strip design, both of which are illustrated in U.S. patent application Ser. No. 238,071 filed Aug. 30, 1988, which is hereby incorporated by reference.

Figure 2:
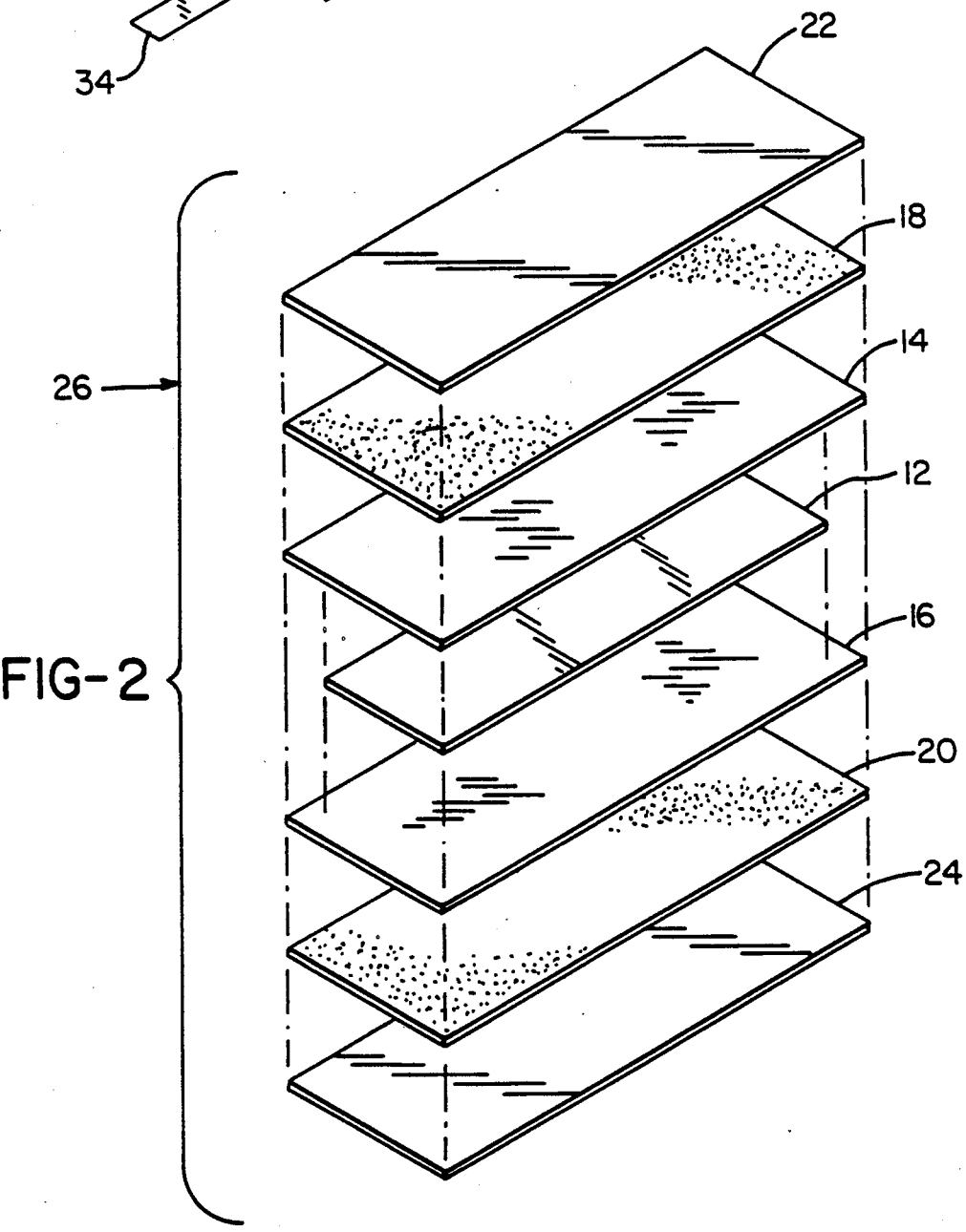
FIG. 2 is an exploded perspective view of a laminar thin cell battery which may be used in accordance with the present invention.

Referring to FIG. 2, battery 26 is a cell laminate which includes an anode 12, first and second layers of an ionically conductive electrolyte 14, 16 which contact anode 12 on opposite sides respectively, and first and second cathode layers 18, 20 which contact the sides of electrolyte 14 and 16 which are not in contact with anode layer 12. Current collectors 22 and 24 respectively contact the sides of cathode layers 18 and 20 which are not in contact with electrolyte layers 14 and 16. The laminate shown in FIG. 2 is actually a bi-faced structure to maximize the use of anode 12.

The materials used for forming the different layers of battery are known in the art. For example, in one preferred embodiment, battery 26 comprises a portion of a secondary cell having an alkali metal foil anode 12 having a typical thickness of about 100–150 microns, the ionically conducting polymeric electrolyte layer 14 and 16 containing an ionizable alkali metal salt having a typical thickness of about 10 to 75 microns, cathode layers 18 and 20 including a finely divided transition metal oxide having a typical thickness of about 50 to 100 microns, and current collectors 22 and 24 which typically take the form of metal foils having a typical thickness of about 5 to 25 microns.

In a particularly effective embodiment, anode 12 comprises a lithium foil, electrolyte layers 14 and 16 comprise a radiation polymerizable compound, the cathode layers 18 and 20 comprise a composite of finely divided vanadium oxide ($V_6O_{13}$), carbon black or an electronically conductive polymer and a solid electrolyte material, and the cathode current collecting layers 22 and 24, comprise nickel, stainless steel, aluminum foils, metal coated polymers or electrically conductive polymeric materials such as a thin film of polyethylene terephthalate having electrodeposited thereon a layer of nickel metal.

More specifically, a typical anode material 12 is lithium foil, an alloy of lithium, or lithium coated foil such as nickel or copper foil having a layer of lithium deposited on its front or front and back surfaces Lithium is preferred because it is very electropositive, passivates and is light in weight When using lithium materials as anode layers to produce a laminar battery because of their high reactivity, it is necessary to maintain the lithium materials in a water and air free environment to prevent any undesirable chemical reaction from occurring.

Electrolyte layers 14 and 16, which are ionically conductive in nature, may be formed by preparing a mixture of a liquid monomeric or prepolymeric radiation polymerizable compound, a radiation inert ionically conducting liquid, and an ionizable alkali metal salt. The alkali metal salt is preferably comprised of a lithium salt, such as $LiCF_3SO_3$, $LiAsF_6$, $LiClO_4$, $LiBr$, $LiI$, $LiBO_4$ or $LiPF_6$. Radiation inert ionically conductive liquids are preferably bi-polar aprotic solvents and include propylene carbonate γ-butryrolactone, dimethoxyethane, 1,3-dioxolane and 2-methyl-tetrahydrofuran. Radiation polymerizable compounds may be obtained by reacting a polyethylene glycol with acrylic or methacrylic acid. Other examples include acrylated epoxies, e.g., bisphenol A epoxy diacrylate, polyethylene acrylates, copolymers of glycidyl ethers and acrylates or a vinyl compound such as N-vinylpyrrolidone. The monomers which are selected do not substantially adversely react with the anodic metal after polymerization, as the anodic metal tends to be highly reactive. Other electrolyte materials which are not radiation curable may also be used in accordance with the present invention such as solid electrolytes or electrolytes comprising a solid solution of an alkali metal salt in a polymeric matrix such as $LiClO_4/PEO$ electrolytes.

The cathode layer comprises a metal oxide intercalation compound, an electrically conductive material such as carbon or metal particles, and an electrolyte material.

While $V_6O_{13}$ is the preferred active material for cathode layers 18 and 20, the active cathode component may alternatively include metal chalcogenides such as $NbSe_3$, $V_2O_5$, $MnO_2$, $TiS_2$, $MoO_2$, $MoS_3$, $Cr_3O_6$, $Li_xV_3O_8$, $V_3O_8$, $VS_2$, $NbSe_2$, $FeOCl$, $CrOBr$, $TiNCl$, $ZrNCl$, $HfNBr$, $NiS_2$, $FeS_2$, $FeS$, $NiS$, $NiS_3$, $WO_2$, or electronically conducting organic polymers such as polypyrrole and polyacetylene.

Other appropriate materials for the cathode current collecting layers 22 and 24, besides metal foils are conductive metals, conductive polymers, metal coated polymers, screens, grids, foamed metals and the like.

The battery is produced by laminating the respective layers together to form a unitary structure. The lamination process may include coating the cathode layers 18, 20 and the electrolyte layers 14, 16 onto the cathode current collecting layers 22 and 24 by doctor blade continuous casting, solvent evaporation technique, extrusion or other coating methods.

Although battery 26 is referred to as a cell laminate, it should be noted that there are in fact two cells in the strict sense of the term, each having a cathode in an ion exchange relation with a commonly shared anode. Where the anode material is lithium foil, a substantial economic savings is realized when the lithium foil is commonly shared by dual electrolyte and cathode layers, although those skilled in the art will appreciate that the present invention could be constructed with a single anode layer in an ion exchange relation with a single cathode layer if desired. The electrochemical cell shown in FIG. 2 will function as a single cell if the two cathode layers 20 and 18 are always joined by a single cathode current collecting substrate or are otherwise joined electrically.

FIGS. 3(a) and 3(b) show the steps for manufacturing an alternative battery similar to that shown in FIG. 2.

Referring to FIG. 3(a), laminate assembly 100 includes current collecting substrate 124, which is overcoated with a layer of cathode material 120, which in turn is overcoated with a layer of electrolyte material 116. Cathode 120 and electrolyte compositions 116, if polymerizable, are then partially or totally cured by heat or exposure to radiation. If they are solvent based compositions, they are set by drying.

Lithium anode 112 is placed onto approximately one half of electrolyte 116. The length of lithium anode 112 is less than one half of the length of electrolyte 116 to enable electrolyte 116 to be folded over anode 112 as will be discussed with respect to FIG. 3(b). Electrically conductive terminal 132 is then placed onto anode 112. Terminal 132 is preferably a flat metal or metal wire. Suitable materials include copper, nickel, other conductive metals, conductive polymers and metal coated polymers. Where terminal 132 is copper, a strong bond is formed between terminal 132 and the lithium anode 112 and no adhesive is required to adhere the two elements together.

As shown in FIG. 3(b), the laminate assembly 100 is folded longitudinally upon itself along axis A—A to cause electrolyte 116 to surround anode layer 112. Anode layer 112, should have a smaller length than the length of one half of electrolyte layer 116 to ensure that the anode layer 112 does not contact cathode layer 120. Alternatively, instead of folding laminate assembly 100 longitudinally along axis A—A, assembly 100 could be cut along line B—B, or originally fashioned in the two such similar sections, and the two sections placed one upon the other to form an assembly very similar to that of FIG. 3B so long as the current collector layer 124 is made electrically continuous between its upper and lower halves to utilize the electrical energy of both the upper and lower cells.

When folded along axis A—A, despite retaining flexibility, there may exist some deterioration in the integrity of the layers at the fold line. This will not affect the operation of the cell. Even if the layers do not remain continuous at or about the fold line, the cell will continue to function, as it is in essence a dual cell design comprising an upper cell and a lower cell which share a common anode. As indicated above, as long as the current collector layer 124, links the upper and lower cathode layers 120, both the upper and lower cells will function even if there is some degradation of the electrolyte layer 116 and/or cathode layer 120, at or about the fold line.

Still referring to FIG. 3(b), a second terminal 134 is attached at one end to the outside of cathode current collecting layer 124 by any means known in the art such as applying electrically conductive adhesives, soldering or spot welding. Electrode 134 is of a length sufficient to permit the end not attached to protrude from beyond cathode current collecting layer 124. Electrode 134 is made from the same materials as electrode 132.

The cell laminate is then pressed or rolled together to assure uninterrupted contact between the layers, and taken together constitutes a battery collectively referred to as Device A. Where cathode 120 and electrolyte compositions 116 are polymerizable but have been only partially cured, the compositions will retain flexibility to permit folding with minimal deterioration at or about the fold line. Additionally, the partially cured cathode 120 and electrolyte 116 layers will also exhibit a tackiness that will cause the layers to adhere to one another and to anode layer 112. This can additionally provide a more intimate contact between the layers. The partially cured polymerizable components may then be completely cured.

The cathode current collector layer 124 may be designed to extend on the two parallel sides adjacent and perpendicular to the fold line beyond the cathode material layer 120 thereon, so that a bead of adhesive material may be applied at or near the edge of the perimeter of the interior surface of cathode current collecting layer 124. In this manner, when laminate assembly 100 is folded onto itself, the bead of adhesive will assist in securing assembly 100 together until it is ultimately enveloped by a heat-sealed moisture impermeable multilayered film.

Additionally, the individual layers of laminate assembly 100 may be optionally slit at or about the fold to assist in maintaining laminate assembly 100 as a unitary structure by reducing its tendency to separate at the fold.

Device A is not completely resistant to environmental attack. This is because cathode current collector 124 typically contains interstitial apertures having diameters of 10 microns or more through which atmospheric contaminants, primarily air and water, may enter and destroy device A. Therefore, device A is inserted into a protective material and sealed as illustrated in FIG. 4.

FIG. 4 shows a completed laminar battery assembly generally designated 180. Assembly 180 includes laminar battery device A, which is enveloped in a heat sealed moisture impermeable multilayered material represented by elements 128 and 129 except for electrodes 132 and 134, which slightly protrude from beyond material 128 and 129 to enable connection of the assembly to an external device.

To manufacture the assembly shown in FIG. 4, while maintaining an oxygen and moisture-free environment, device A is placed between two sheets of the multilayered material 128 and 129 so that the sheets of material 128 and 129 completely surround device 100 except for electrodes 132 and 134, which protrude from beyond sheets 128 and 129. Each of the four edges of the respective sheets of material are then heat sealed to fuse the edges of the respective materials to each other.

Sealing is accomplished by utilizing a Multivac Vacuum Packing Machine from Sepp. Haggenmueller, KG Allgau, W. Germany, which operates by utilizing heated platens which are maintained at sufficient heat and pressure to melt and seal the polymeric edges which envelop the battery device. For example a temperature of 100° C. to 200° C. at a pressure of 20-40 psi is typically used.

In practice, each pair of respective edges desired to be sealed together are inserted between the two heated platens and the sealing apparatus is actuated to cause the platens to move towards each other until the edges to be sealed are in intimate contact. Pressure and heat are applied to the edges for a sufficient time period ranging from about 1 second to about 5 seconds. The sealing procedure is repeated for each of the other three pairs of edges to be sealed to produce an assembly such as shown in FIGS. 1 and 4. Alternatively, up to all sides can be sealed at once. Particular care must be utilized when sealing the edges containing electrodes 132 and 134 to prevent them from inadvertently breaking off during the sealing process. However, a sufficient pressure must be applied to the edges to seal around the electrodes to ensure an air and water impermeable seal.

A further feature is that the sealing operation be conducted in a vacuum atmosphere having a pressure as low as possible, i.e. 4 to 40 mm Hg. The sealing under a vacuum accomplishes several purposes When the sealing operation has been completed, the vacuum enables the multilayered material to tightly adhere to the laminar cell to prevent the cell from moving within the sealed enclosure and to prevent delamination of the component layers. As a result, the battery assembly is much more resistant to physical damage caused during shipment and transportation. Further, the tight adhesion of the multilayered material to the cell enables the surface area of the battery to be maintained in a minimal volume. Accordingly, this enables the production of a small, thin battery.

The primary purpose of multilayered material is to effectively envelop device A and to protect device A from oxygen or moisture An example of one material suitable for use is shown in FIG. 4. Multilayered film materials 128 and 129, having an overall thickness of approximately 100 microns, include a first inner insulating, adhesive, heat-sealable layer 142 and 144; a second thermoplastic layer 146 and 152; a third layer 148 and 154, consisting of an air and water occlusive metal foil; and a fourth outer protective layer 150 and 156, consisting essentially of a polyester polymer, i.e. polyethylene terephthalate. Primer and/or adhesive films required to bond one layer to another, not pictured, are utilized when necessary.

The first inner thermoplastic layer 142 and 144 has an approximate thickness of 25 to 50 microns, and functions as an electronic insulator, a heat-sealable material and as an adhesive between dissimilar surfaces. Electrical insulating properties are required in this first inner layer 142 and 144, because s electrodes 132 and 134 extend from device A a direct short would be produced across the metal foil layer 148 and 154 if both electrodes were permitted to directly contact metal foil layer 148 and 154.

This first inner layer 142 and 144 must also be sealable upon the application of pressure and heat, at sufficiently low temperatures and pressures so as not to degrade device A. When the sealing operation is performed, first inner layer 142 and 144 becomes fusible to enable upper and lower surfaces 128 and 129 of the multilayered film to be sealed together On the edge from which electrodes 132 and 134 will protrude, the heat-sealable material must flow around the electrodes to achieve a continuous seal between the upper and lower surfaces of the multilayered film 128 and 129 and the electrodes.

Additionally, first inner layer 142 and 144 must also possess an adhesive quality that will enable it to bind together the dissimilar surfaces consisting of electrodes 132 and 134, and the second thermoplastic layer 146 and 152, (or between electrodes 132 and 134 and the third metal foil layer 148 and 154, in the event that a second thermoplastic layer 146 and 152 is not included.)

Examples of suitable materials for the first inner layer include a copolymer of ethylene and acrylic acid, Surlyn (an extrudable ionomer resin which is defined as a metal salt of an ethylene/organic acid copolymer available from DuPont Company of Wilmington, Delaware, hereinafter designated "Surlyn"), and any other suitable materials known in the art. Ethylene and acrylic acid copolymers and Surlyn are preferred because each exhibits the necessary insulating, heat-sealing and adhesive properties discussed above. The amount of heat and pressure required to seal the multilayered film 128 and 129, wherein the first insulating layer is ethylene acrylic acid will vary depending upon the chosen thickness and composition of all layers in the multilayered film 128 and 129. However, as a general approximation temperatures in the range of 100°-200° C. are required, as well as pressures of approximately 20-40 psi for a time period of approximately 1-5 seconds where the ethylene and acrylic acid copolymer is about 25 microns thick.

Caution must be exercised with the choice of composition of the first inner layer 142 and 144, and with the amount of heat and pressure to be applied. The first inner layer 142 and 144 must be permitted to flow, but not to achieve so high a degree of liquidity that the composition will escape from the area wherein sealing is desired, or that will permit the electrodes 132 and 134 to traverse through the first inner layer 142 and 144 and the second thermoplastic layer 146 and 152 to cause the terminals to simultaneously contact the metal foil layer 148 and 154 and create a short.

From FIG. 4, it will be obvious to those skilled in the art that the first inner layer 142 and 144 needs to exhibit the ability to act as an adhesive between dissimilar surfaces only along the edge from which the electrodes 132 and 134 protrude, and specifically only in the area bounded by the electrodes 132 and 134. Therefore, in another embodiment of the present invention, the first inner layer may be limited to the area at or about the electrodes. In still another embodiment, the material which acts as an adhesive may be coated, primed, or otherwise deposited on electrodes 132 and 134. In either embodiment, the additional layer provides both insulating and heat sealing capabilities throughout the remainder of the inner surface of the multilayered film.

Where the first inner layer 142 and 144 provides all necessary insulating, heat sealing and adhesive properties, the second thermoplastic layer may be omitted. However, where the first inner layer 142 and 144 is provided only in or about the area bounded by electrodes 132 and 134, the second thermoplastic layer 148 and 154 is required in order to provide both insulating and heat-sealing abilities throughout the remainder of the inner surface of the multilayered film. Even where the first inner layer 142 and 144 provides all needed properties, additional benefits are derived from the inclusion of the second thermoplastic layer 146 and 152 in that additional mechanical and chemical protection is provided and in that this type of multilayered film is commercially available, such as product I.D. #KSP-150-IMB from Kapak Corporation of Minneapolis, Minn. which, while lacking the required adhesive properties described above, does provide insulating and heat-sealing capability.

Still referring to FIG. 4, second thermoplastic layer 146 and 152 is utilized to exhibit these properties. Suitable second thermoplastic layer materials include polyethylene and polypropylene.

It is the purpose of the third layer 148 and 154 and fourth outer protective layer 150 and 156 to provide a barrier for excluding air and water from the battery and to provide rigidity to protect the battery during physical handling.

Where the third metal layer contains small (approximately 10 micron) holes which permit air and water to contact the battery, the fourth outer polymeric protective layer will cover or plug those microscopic holes, providing additional air and water occlusion protection. In some cases two metal layers separated by a bonding film may be needed to provide sufficient air and water occlusion.

In the preferred embodiment, the third layer is preferably a metal such as aluminum foil and the fourth outer protective layer is a polymeric material such as polyethylene terephthalate.

Protective sheet material comprised of multilayered films, is available commercially. For example, product number 41748U30 available from Bell Fibre Incorporated, is a five layered film consisting of a first layer of Surlyn, which is bonded to a second layer of polyethylene which is bonded to a third layer of aluminum foil which is bonded to a fourth layer of polyethylene which is bonded to a fifth layer of polyester. Also available from Bell Fibre, is product number 41750U30 which is a five layered material comprising a first layer of Surlyn film which is bonded to a second layer of Surlyn which is bonded to a third layer of aluminum foil which is bonded to a fourth layer of polyethylene which is bonded to a fifth layer of polyester. Another example of protective sheet material suitable for use with the present invention is available from James River Flexible Packaging Incorporated under the product name Standard Flex Guard. The James River product is a six layered film material comprised of a first layer which is a copolymer of ethylene and acrylic acid, which is bonded to a second layer of polyethylene or polypropylene which is bonded to a third layer of the copolymer of ethylene and acrylic acid, which is bonded to a fourth layer of aluminum foil which is bonded to a fifth layer of the copolymer of ethylene and acrylic acid, which is bonded to a sixth layer of nylon (Saran).

These commercial products are examples of the types of protective sheet materials that may be successfully used in the present invention. Any protective sheet material which exhibits the ability to be heat sealable, air and water occlusive, and resistant to physical and environmental degradation will satisfy the requirements for the present invention.

Having illustrated electrodes 32 and 34 projecting from assembly 10 in FIG. 1, those skilled in the art will appreciate that numerous electrode configurations are possible as long as a seal of the multilayered film 128 and 129 is maintained in or about the area where the electrodes are accessible from the multilayered film.

One such alternative configuration is illustrated in FIG. 5.

FIG. 5 shows assembly 200, including battery 170, shown in phantom, electrodes 178 and 180, in a heat and vacuum sealed moisture impermeable multilayered film 172, which is sealed along the periphery 182. Apertures 174 and 176 have been provided in the upper surface of the multilayered film 172, either before or after sealing, to expose electrodes 178 and 180.

Assembly 200 exhibits the advantages that as electrodes 178 and 180 are nearly completely enveloped by film 172, the electrodes will have a high degree of protection from physical abuse and are not exposed along the same line at or near the point of sealing. Having a staggered orientation at or near the point of sealing will reduce the possibility of any accidental electrical contact between electrodes 178 and 180.

Having described the invention in detail and by reference to preferred embodiments thereof, it will be apparent that modifications and variations are possible without departing from the scope of the invention defined in the appended claims.

What is claimed is:

1. A battery assembly comprising:
    a laminar battery having an anode layer, a cathode layer and an ionically conductive electrolyte layer separating said anode an d cathode layers to form an electrical cell;
    an elongate anode terminal connected to said anode layer;
    a cathode terminal connected to said cathode layer;
    a first layer of electrically insulating adhesive, heat-sealable material capable of adhering to said anode terminal contiguous with and enveloping said cell such that said anode and cathode terminals protrude therefrom;
    a second layer of an insulating and heat-sealable thermoplastic material, selected from the group consisting of polyethylene and polypropylene, contiguous with and totally enclosing said first layer;
    a third layer of a metal foil contiguous with and totally enclosing said second layer, said third layer being electrically insulated from said cell by said first and second layers; and a fourth layer of a nonconductive thermoplastic material having a higher melting point than said first and second layers contiguous with and totally enclosing said third layer, whereby said layers are heat sealed about a periphery of said battery, said anode and cathode terminals protruding from a heat sealed seam thereof and being electrically isolated from said second, third and fourth layers.

2. The assembly of claim 1, wherein said heat sealing occurs under a vacuum.

3. The battery assembly of claim 2, wherein said anode layer comprises lithium foil or a metal foil coated with a layer of lithium, or an alloy of lithium.

4. The battery assembly of claim 2, wherein said battery is a solid state lithium cell.

5. The battery assembly of claim 2, wherein said ionically conductive electrolyte layer includes an ionizable alkali metal salt selected from the group consisting of $LiCF_3SO_3$, $LiAsF_6$, $LiClO_4$, $LiBr$, $LiI$, $LiBO_4$ and $LiPF_6$.

6. The battery assembly of claim 2, wherein said cathode layer comprises a metal oxide intercalation compound, an electrically conductive material and an electrolyte material; said intercalation compound being selected from the group consisting of $V_6O_{13}$, $MoO_2$, $MnO_2$, $V_2O_5$, $TiS_2$, $MoS_3$, $Cr_3O_6$, $Li_xV_3O_8$, $V_3O_8$, $VS_2$, $NiS_2$, $FeS_2$, $FeS$, $NiS$, $WO_2$ or electronically conducting organic polymers; and wherein said electrically conductive material comprises carbon or metal particles.

7. The battery assembly of claim 1, wherein said first layer comprises either a copolymer of ethylene and acrylic acid, or an ionomer resin which is a metal salt of an ethylene/organic acid copolymer.

8. The battery assembly of claim 5, wherein said battery comprises a single cell.

9. The battery assembly of claim 5, wherein said battery comprises a plurality of cells.

10. The battery assembly of claim 5, wherein said battery cell is a bifaced or a bi-polar cell design.

* * * * *